(12) United States Patent
Zhang et al.

(10) Patent No.: US 9,298,707 B1
(45) Date of Patent: Mar. 29, 2016

(54) EFFICIENT DATA STORAGE AND RETRIEVAL FOR BACKUP SYSTEMS

(75) Inventors: Xianbo Zhang, Madison, WI (US); Thomas D. Hartnett, Saint Paul, MN (US)

(73) Assignee: Veritas US IP Holdings LLC, Mountain View, CA (US)

( * ) Notice: Subject to any disclaimer, the term of this patent is extended or adjusted under 35 U.S.C. 154(b) by 79 days.

(21) Appl. No.: 13/250,156

(22) Filed: Sep. 30, 2011

(51) Int. Cl.
*G06F 7/00* (2006.01)
*G06F 17/30* (2006.01)

(52) U.S. Cl.
CPC .... *G06F 17/30008* (2013.01); *G06F 17/30067* (2013.01); *G06F 17/30079* (2013.01); *G06F 17/30174* (2013.01)

(58) Field of Classification Search
CPC .................. G06F 17/30008; G06F 17/30079; G06F 17/30174
USPC ........................................................ 707/645
See application file for complete search history.

(56) References Cited

U.S. PATENT DOCUMENTS

| | | | | |
|---|---|---|---|---|
| 5,403,639 | A * | 4/1995 | Belsan et al. | |
| 6,269,431 | B1 * | 7/2001 | Dunham | 711/162 |
| 6,341,341 | B1 * | 1/2002 | Grummon et al. | 711/162 |
| 6,353,878 | B1 * | 3/2002 | Dunham | 711/162 |
| 6,366,987 | B1 * | 4/2002 | Tzelnic et al. | 711/162 |
| 6,374,266 | B1 * | 4/2002 | Shnelvar | |
| 6,535,869 | B1 | 3/2003 | Housel, III | |
| 6,934,877 | B2 * | 8/2005 | Tamatsu | 714/5.11 |
| 6,954,765 | B2 * | 10/2005 | Spiegel | |
| 7,634,627 | B1 * | 12/2009 | Ohr et al. | 711/162 |
| 7,873,601 | B1 * | 1/2011 | Kushwah | 707/654 |
| 8,041,907 | B1 | 10/2011 | Wu et al. | |
| 8,214,406 | B2 * | 7/2012 | Kushwah | 707/797 |
| 8,234,470 | B2 * | 7/2012 | Tevis et al. | 711/162 |
| 8,285,953 | B2 * | 10/2012 | Yamamoto et al. | 711/162 |
| 2003/0061456 | A1 * | 3/2003 | Ofek et al. | 711/162 |
| 2004/0153720 | A1 | 8/2004 | Lee | |
| 2004/0163029 | A1 * | 8/2004 | Foley et al. | 714/769 |
| 2004/0193841 | A1 * | 9/2004 | Nakanishi | 712/10 |
| 2006/0010174 | A1 * | 1/2006 | Nguyen et al. | 707/202 |
| 2006/0206547 | A1 * | 9/2006 | Kulkarni et al. | 707/205 |
| 2007/0136200 | A1 * | 6/2007 | Frank et al. | 705/50 |
| 2007/0220222 | A1 * | 9/2007 | Boldt et al. | 711/162 |
| 2007/0226436 | A1 * | 9/2007 | Cheng et al. | 711/162 |
| 2008/0114952 | A1 * | 5/2008 | Ganong et al. | 711/162 |
| 2009/0055604 | A1 * | 2/2009 | Lemar et al. | 711/161 |

(Continued)

OTHER PUBLICATIONS

Xianbo Zhang, et al., "System and Method for Event Driven Backup Data Storage," U.S. Appl. No. 12/859,640, filed Aug. 19, 2010, 33 pages.

(Continued)

*Primary Examiner* — Mark E Hershley

(74) *Attorney, Agent, or Firm* — Meyertons, Hood, Kivlin, Kowert & Goetzel, P.C.

(57) ABSTRACT

Systems and methods for providing efficient storage and retrieval of data are disclosed. A two-level segment labeling mechanism may be employed to ensure that unique data segments from particular backup data sets are stored together in a storage container. The two-level segment labeling may facilitate preservation of the relative positions of segments within the backup stream during compaction operations. Also, backup data restoration performance may be improved by use of multiple read threads that are localized to particular storage containers.

18 Claims, 7 Drawing Sheets

(56) References Cited

U.S. PATENT DOCUMENTS

| | | | |
|---|---|---|---|
| 2009/0113153 A1* | 4/2009 | Yamamoto et al. | 711/162 |
| 2009/0125692 A1* | 5/2009 | Yamamoto et al. | 711/162 |
| 2009/0254572 A1* | 10/2009 | Redlich et al. | 707/10 |
| 2009/0307333 A1* | 12/2009 | Welingkar et al. | 709/219 |
| 2010/0037056 A1* | 2/2010 | Follis et al. | 713/171 |
| 2010/0179941 A1* | 7/2010 | Agrawal et al. | 707/624 |
| 2010/0186014 A1* | 7/2010 | Vaghani et al. | 718/101 |
| 2010/0205163 A1* | 8/2010 | Eshghi et al. | 707/698 |
| 2010/0281067 A1* | 11/2010 | Boldt et al. | 707/802 |
| 2010/0318759 A1* | 12/2010 | Hamilton et al. | 711/171 |
| 2011/0055293 A1* | 3/2011 | Tevis et al. | 707/812 |
| 2011/0119234 A1* | 5/2011 | Schack et al. | 707/639 |
| 2011/0184935 A1* | 7/2011 | Marlin | 707/719 |

OTHER PUBLICATIONS

Stefan Wörthmüller, "Multithreaded File I/O," Dr. Dobb's The World of Software Development, Sep. 28, 2009, http://www.drdobbs.com/parallel/multithreaded-file-io/220300055, 4 pages. [Retrieved Dec. 12, 2014].

* cited by examiner

US 9,298,707 B1

EFFICIENT DATA STORAGE AND RETRIEVAL FOR BACKUP SYSTEMS

BACKGROUND

The present disclosure relates generally to deduplication storage systems, and more particularly to methods and systems to improve rehydration performance in deduplication storage systems.

Storage systems may store large amounts of data originating from many different computers. For example, a backup storage system may regularly receive data from many different end-point computer systems (e.g., desktops in an organization), and may store backup copies of that data in a data store. Each source computer may request insertion of files (or file segments) into the storage system, and later request removal of any of the files or segments.

One method of efficiently storing data includes data deduplication, which attempts to reduce the storage of redundant data. Deduplication mechanisms may both remove duplicate data already stored in shared storage and disallow duplicate data from being stored in shared storage. Accordingly, one copy of unique data may be stored, which reduces the needed storage capacity.

However, unless techniques are employed to maintain spatial locality of backup data, deduplication techniques may tend to cause data segments from a particular backup data set to become scattered over time. Scattering of the backup data may cause an artificially large number of storage containers to be required for storing deduplicated data, and accordingly performance may suffer during rehydration (a process for reconstructing backed-up original files from segments stored in a deduplication system).

Furthermore, the scattering of data segments from a particular backup data set may result in non-sequential storage of backup data. Thus, conventional methods that are well-suited to retrieval of sequentially stored data may provide limited effectiveness when implemented on backup data sets that include scattered data. Accordingly, rehydration performance of conventional techniques may suffer.

SUMMARY

Systems and methods for providing efficient storage and retrieval of data are disclosed. A two-level segment labeling mechanism may be employed to ensure that unique data segments from particular backup data sets are stored together in a storage container. The two-level segment labeling may facilitate preservation of the relative positions of segments within the backup stream during compaction operations (e.g., operations in which various data segments are relocated in order to make larger contiguous groups of empty segments available for subsequent use). Also, backup data restoration performance may be improved by use of multiple read threads that are localized to particular storage containers.

In some embodiments, data corresponding to a particular backup session of a backup source is received. Based on source identification information that may in some cases be derived from the received backup data segments, a storage container corresponding to the particular backup source may be identified. During a compacting operation (e.g., performed by the deduplication system), data segments that correspond to the particular session of the backup source may be stored contiguously within the storage container. In this manner, good data locality may be ensured.

In some embodiments, segments corresponding to various backup sessions of the same source may be stored sequentially (e.g., corresponding to the order in which the segments were received by the deduplication system). Some embodiments may include determining the order that the segments were received, based on session identification information corresponding to the particular backup session.

Some embodiments include determining the source identification information corresponding to the first backup source based on information included in the received backup data. In some cases, storing the segments corresponding to the particular backup session contiguously includes removing one or more other segments from the particular storage container to allow relocating one or more segments corresponding to the particular backup session.

In some embodiments, the particular storage container stores a plurality of backup sessions corresponding to the first backup source and one or more backup sessions corresponding to a second backup source that is different from the first backup source. The compacting the data may in some embodiments further comprise storing the segments corresponding to the plurality of backup session of the first backup source contiguously within the particular storage container.

In some embodiments, the first backup source corresponds to a first device, and the second backup source corresponds to a second device that is different from the first device. In some embodiments, the first backup source corresponds to a first backup configuration at a first device, the second backup source corresponds to a second backup configuration at the first device.

Some embodiments include a storage array that includes the particular storage container. In some embodiments, the compacting the data further comprises storing the segments corresponding to the particular backup session in a sequential order corresponding session identification information included with the received backup data.

In some embodiments, the storing the segments corresponding to the particular backup session contiguously includes removing one or more other segments from the particular storage container and relocating one or more segments corresponding to the particular backup session.

Various embodiments of the present disclosure may include receiving a request to restore a particular set of data, identifying a set of storage locations corresponding to the requested particular set of data, generating two or more read requests that each correspond to a different proper subset of a plurality of storage containers corresponding to the storage locations, causing a plurality of reader threads to read data from the plurality of storage containers, and sending the data read by the plurality of reader threads. The set of storage locations may include locations of data segments stored at the plurality of storage containers. Each of the two or more read requests may include ones of the identified set of storage locations that are stored at the corresponding proper subset of storage containers. Each reader thread may correspond to at least one of the two or more read requests, and each reader thread may read data from the storage locations included in the corresponding read request.

In some of the present embodiments, sending the data read by the plurality of reader threads includes sequencing the data read by the plurality of reader threads in accordance with the received request to restore the particular set of data.

In some embodiments, the causing the plurality of reader threads to read data from the plurality of storage containers includes causing multiple rounds of reader threads to read data from the plurality of storage containers.

DETAILED DESCRIPTION

Data deduplication may be employed to eliminate storage of duplicated data content, thereby reducing the amount of resources needed for backup storage of enterprise data. As one example, a single-instance-storage (SIS) volume may be used in maintaining data backups for servers and other computing equipment within an enterprise network. In an SIS volume, deduplication may ensure that only a single instance of a particular piece of data is stored. Additionally, for subsequent backups occurring over time, data that has not changed from one backup to another need not be stored in the subsequent backup. In this manner, significant reductions in required backup data storage space can be realized.

Deduplication in a backup environment may include a deduplication storage system (DSS) performing an initial full backup of a file server, during which the backup data is divided and identified. Subsequent daily backups of the file system may involve the DSS identifying new or changed segments of data, and storing only the new or changed data in the single instance storage volume. Depending upon the number of new or changed files in the file system, a reduction of size of the subsequent backups (as compared to the initial full backup) can be as much as 99%. The single instance store approach to backup allows for very small daily backups with an ability to recover a full image from any backup on any day. Furthermore, the distinction between a "full" backup and an "incremental" backup may disappear, as all backed-up data can be restored at any time using a single backup restore.

However, deduplication techniques used in the conventional deduplication systems may tend to cause data segments from a particular backup data set to become scattered within the SIS volume over time. Scattering of the backup data may cause an artificially large number of storage containers to be required for storing deduplicated data, and accordingly rehydration performance (e.g., during restoration of the deduplication data) associated with conventional techniques may suffer. Rehydration performance may also be adversely impacted by inefficiencies associated with conventional techniques for reading scattered, non-sequential data segments from the SIS volume. Accordingly, rehydration performance may be improved by the present methods and systems for reducing scattering of backup data by preserving data locality via the use of segment labeling. Rehydration performance may also be improved by use of the present methods and systems for data retrieval.

Figure 1:
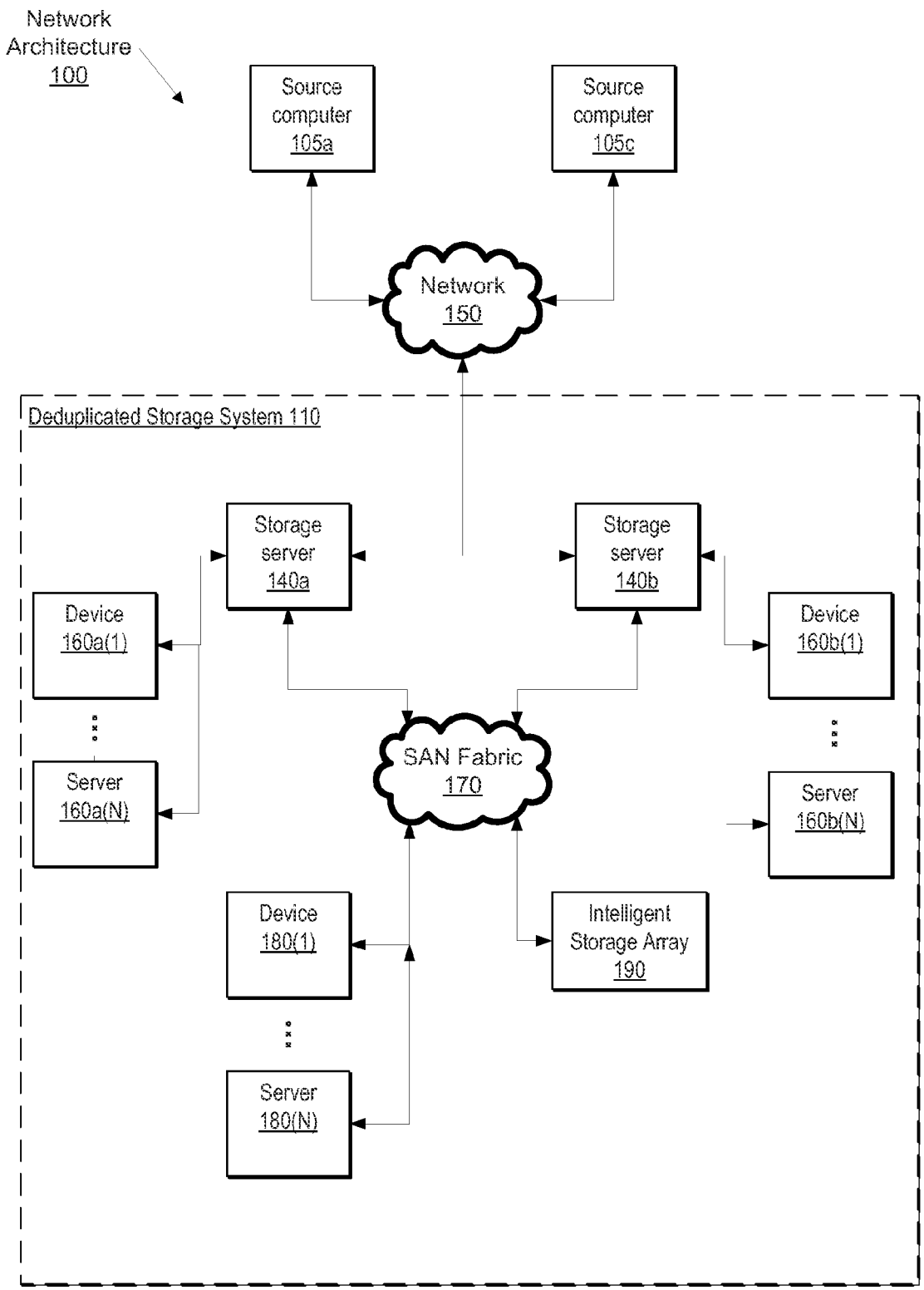
FIG. 1 is a block diagram illustrating the components of a network architecture configured to implement a deduplicated storage system (DSS), according to some embodiments.

FIG. 1 is a block diagram illustrating the components of a network architecture configured to implement a deduplication storage system, according to some embodiments. Network architecture 100 illustrates multiple source computers 105a-105c connected via network 150 to deduplicated storage system 110.

In the illustrated embodiment, source computers 105 are configured to communicate with DSS 110 via storage servers 140a and 140b. Storage servers 140 and/or various other storage components of DSS 110 may be used to implement a storage data store for storing data objects of inserted files. In some embodiments, source computers 105 may be configured to communicated with DDS 110 via fewer, additional, or other servers, such as a proxy server.

In the illustrated embodiment, storage server 140a is further depicted as having storage devices 160a(1)-(N) directly attached, and storage server 140b is depicted with storage devices 160b(1)-(N) directly attached. Storage servers 140 are also connected to a SAN fabric 170, although connection to a storage area network is not required in all embodiments. In some embodiments, various other types of networks, such as Ethernet networks may be used in place of SAN fabric 170. In one embodiment, SAN fabric 170 supports access to storage devices 180(1)-(N) by storage servers 140a and 140b, and by source computers 105a-105c via network 150. Intelligent storage array 190 is also shown as an example of a specific storage device accessible via SAN fabric 170. In various embodiments, network architecture 100 may be implemented as part of a cloud computing platform.

Figure 2:
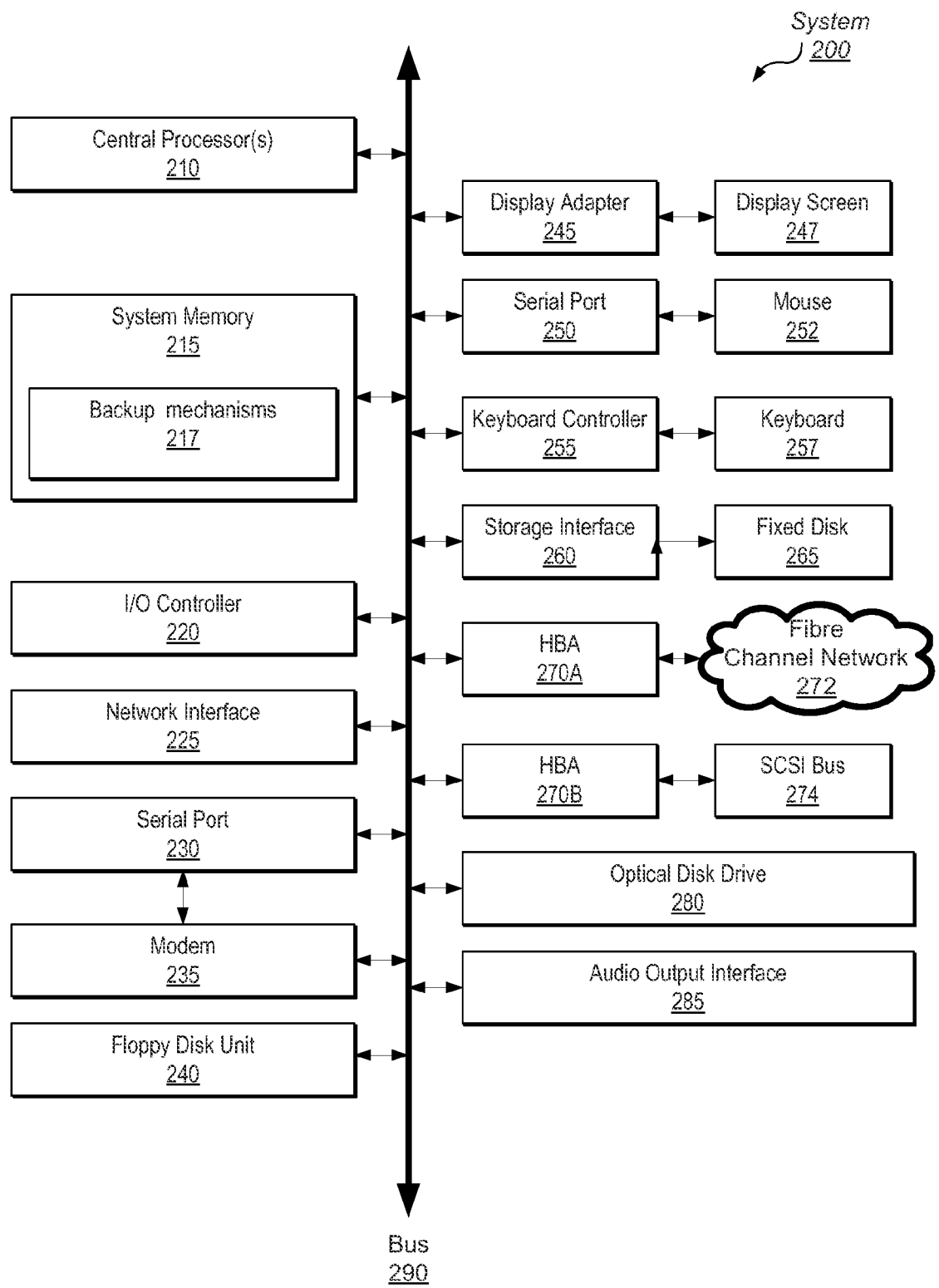
FIG. 2 depicts a block diagram of a computer system suitable for implementing a client or server computer in a deduplicated storage system and configured to provide improved storage and retrieval of data, according to some embodiments.

FIG. 2 depicts a block diagram of a computer system 200 suitable for implementing a client or server computer in a deduplicated storage system (e.g., source computers 105 and storage servers 140 in DSS 110 of FIG. 1), according to some embodiments. Computer system 200 includes a bus 290 which interconnects major subsystems of computer system 200, such as a central processor 210, a system memory 215 (typically RAM, but which may also include ROM, flash RAM, or the like), an input/output controller 220, an external audio device, such as a speaker system via an audio output interface 285, an external device, such as a display screen 247 via display adapter 245, serial ports 230 and 250, a keyboard 257 (interfaced with a keyboard controller 255), a storage interface 260, a floppy disk drive 240 operative to receive a floppy disk, a host bus adapter (HBA) interface card 270A operative to connect with a Fibre Channel network 272, a host bus adapter (HBA) interface card 270B operative to connect to a SCSI bus 274, and an optical disk drive 280 operative to receive an optical disk. The illustrated embodiment may also include a mouse 252 (or other point-and-click device, coupled to bus 290 via serial port 250), a modem 235 (coupled to bus 290 via serial port 230), and a network interface 225 (coupled directly to bus 290).

In some embodiments, bus 290 may allow data communication between central processor 210 and system memory 215, which may include read-only memory (ROM) or flash memory (neither shown), and random access memory (RAM) (not shown), as previously noted. The RAM may be the main memory into which the operating system and application programs are loaded. The ROM or flash memory can contain, among other code, the Basic Input-Output system (BIOS), which controls basic hardware operation such as the interaction with peripheral components. Applications and/or data resident with computer system 200 are generally stored on and accessed via a computer readable medium, such as a hard disk drive (e.g., fixed disk 265), an optical drive (e.g., optical drive 280), a floppy disk unit 240, or other storage medium. For example, various ones of these storage facilities may be used to store data objects in a DSS data store. In some embodiments, applications can be in the form of electronic signals modulated in accordance with the application and data communication technology when accessed via network modem 235 or interface 225.

Storage interface 260, as with the other storage interfaces of computer system 200, can connect to a standard computer readable medium for storage and/or retrieval of information, such as a fixed disk drive 265. Fixed disk drive 265 may be a part of computer system 200 or may be separate and accessed through other interface systems. Modem 235 may provide a direct connection to a remote server via a telephone link or to the Internet via an internet service provider (ISP). Network interface 260 may provide a direct connection to a remote server via a direct network link to the Internet via a POP (point of presence). Network interface 225 may provide such connection using wireless techniques, including digital cellular telephone connection, Cellular Digital Packet Data (CDPD) connection, digital satellite data connection or the like.

Various other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application.

Code to implement various aspects of the present disclosure can be stored in computer-readable storage media such as one or more of system memory 215, fixed disk 265, optical disk 280, or floppy disk read by floppy disk unit 240. For example, system memory 215 may include backup mechanisms 217. On source computers, backup mechanisms 217 may include software that facilitates requesting that given files be inserted or removed from the DSS, and/or requesting restoration of previously backed-up data. On a computer within the DSS itself, backup mechanisms 217 may include software for detecting requests to insert duplicate data, for marking the data as described herein, for detecting whether a given data object is expired (e.g., in response to receiving a remove request corresponding to the data object), and/or for restoring data. In various embodiments, the operating system provided on computer system 200 may be any of various operating systems, including MS-DOS®, MS-WINDOWS®, OS/2®, UNIX®, Linux®, or another known operating system.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Segment Labeling to Preserve Data Locality

Figure 3:
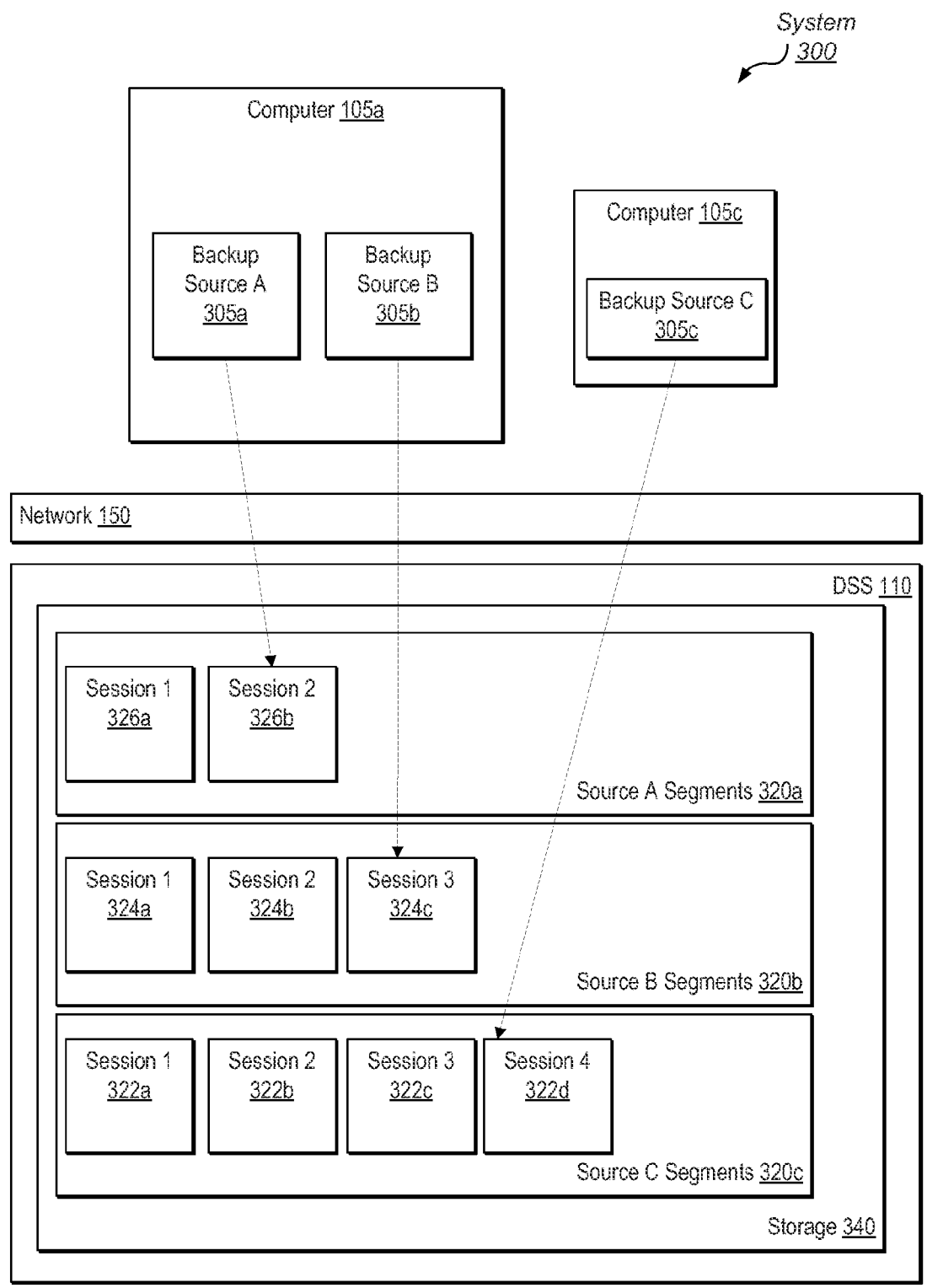
FIG. 3 is a block diagram illustrating various components of a DSS architecture configured to maintain spatial data locality of backup segments during a compaction process.

FIG. 3 is a block diagram illustrating various aspects of a DSS architecture directed to maintaining data locality in a deduplication process through the use of source and/or session labeling, according to some embodiments. As noted above, deduplication techniques used in conventional deduplication systems that lack the present techniques may tend to cause data segments from a particular backup data set to become scattered within a backup volume, and thus may cause an artificially large number of storage containers to be required for storing deduplicated data. Furthermore, segments that preferably would be stored within the same container, or set of containers (e.g., backup data from a particular backup session, backup data from various sessions of a particular backup source) may be stored across different sets of containers due to the scattering of conventional deduplication techniques.

Figure 4A:
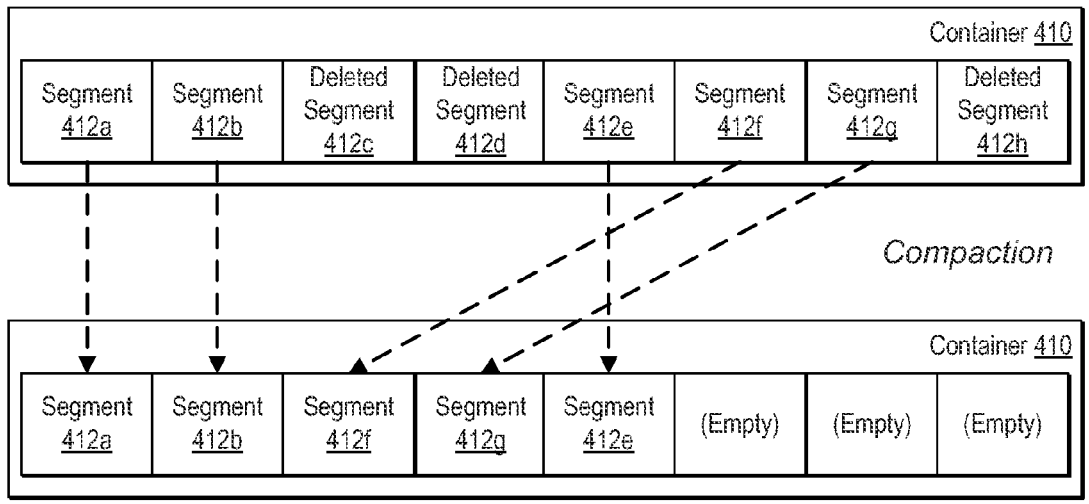
FIGS. 4A and 4B depict various aspects of deduplication and compaction that may be addressed by various ones of the present embodiments.
Figure 4B:
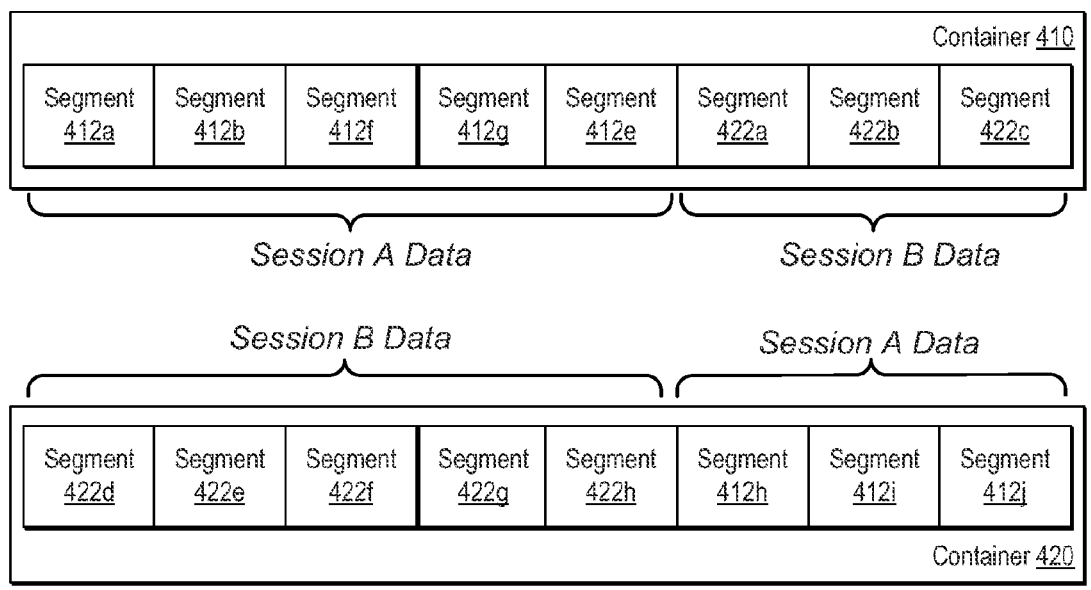

FIGS. 4A and 4B depict various aspects that may be associated with deduplication, and illustrate a scenario in which data may be scattered by conventional deduplication and compaction processes. FIG. 4A depicts container 410 that initially includes data segments 412*a-h*, which may each correspond to data from a particular backup session. As shown in the upper depiction of container 410, data segments 412*c*, 412*d*, and 412*h* may be marked for deletion during, for example, a deduplication process determining that data corresponding to these segments is stored elsewhere within the storage volume. Alternately, data segments 412*c*, 412*d*, and 412*h* may in some cases be marked for deletion due to an expiration of the corresponding data (e.g., per a time-based retention policy), or due to user deletion of the corresponding data (e.g., deletion of all references to the corresponding data). A compaction step may be executed to move data corresponding to segments 412*f*, 412*g* to the segment locations formerly corresponding to deleted segments 412*c* and 412*d*, thereby making three contiguous empty segment locations available for subsequent use. As can be seen in the lower depiction in FIG. 4A of container 410, the remaining segments 412*a*, 412*b*, 412*e*, 412*f*, and 412*g* corresponding to the particular backup session remain contiguously stored in this example, but are no longer sequentially ordered due to the scattering caused by the conventional deduplication and compaction process.

Turning now to FIG. 4B, results of possible subsequent storage processes involving container 410 and a neighboring container 420 are shown. As shown in FIG. 4A, conventional deduplication and compaction may cause segments 412*a*, 412*b*, 412*e*, 412*f*, and 412*g* corresponding to the particular backup session (Session A) to be stored non-sequentially in container 410, with three empty segment locations following. In a subsequent step, segments 422*a-h* corresponding to a different backup session (Session B) may be stored. Conventional methods may store these eight segments in the three empty segments locations of container 410, and five contiguous empty segment locations of the following container 420. Thus, data corresponding to Session B data may be stored across multiple containers. Subsequent storage of additional data corresponding to Session A at the next available segment locations (e.g., in container 420) may result in data corresponding to Session A also being stored across multiple containers. Furthermore, in conventional deduplication and compaction techniques, Session A and Session B may be from different sources. Thus, conventional techniques may cause segments corresponding to backup data from different sources to be intermixed.

As illustrated in FIGS. 4A and 4B, conventional techniques may result in non-optimal utilization of containers, which may add inefficiency to the retrieval and rehydration processes associated with restoring backed-up data. Restoration performance may be improved by ensuring that related data (e.g., data corresponding to the same backup session) is stored in the same container, or set of containers.

Returning to FIG. 3, storage of data within the DSS according to some of the present systems and methods is depicted. In some embodiments, system 300 of FIG. 3 may correspond to network architecture 100 of FIG. 1. For continuity, analogous components are labeled identically. However, in various embodiments, system 300 and network architecture 100 may represent separate systems, such that hardware implementing DSS 110 of FIG. 3 need not always correspond exactly to the analogously named component in FIG. 1.

As in FIG. 1, system 300 includes two source computers 105a and 105c, each in communication with DSS 110 over network 150. In the illustrated embodiment, both of source computers 105a and 105c includes at least one backup source 305. As depicted in FIG. 3 with regard to backup sources 305a and 305b corresponding to computer 105a, a single device may correspond to more than one unique backup source 305. Backup source 305 denotes a specific backup configuration, and therefore two different backup sources 305 may indicate not only two different computer systems, but alternately may indicated backup processes corresponding to, for example, two different backup configurations (e.g., sets of backup directories) on the same computer. Backup sources 305a and 305b depicted in FIG. 3 provide an example of two backup sources on a single computer, possibly resulting from two different backup profiles.

Figure 5:
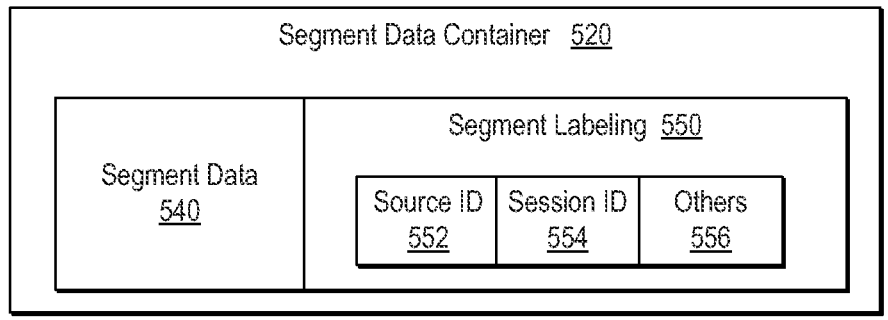
FIG. 5 illustrates the components of a backup data segment according to some embodiments.

Referring also to FIG. 5, a representation of a data structure according to one embodiment of the present disclosure is presented. As shown, backup segment data 540 may include (or have appended thereto) segment labeling 550 that may include information that may be used by ones of the present embodiments to preserve data locality. Segment labeling 550 may include, for example, source identification information (Source ID 552) identifying a particular backup source or configuration associated with the segment data, and/or session identification information (Session ID 554) identifying a particular backup session or instance associated with segment data 540. Segment labeling 550 may in some cases also include other information 556 (e.g., timestamps, metadata) that may further facilitate the preservation of data locality provided by the present embodiments. In some embodiments, segment labeling 550 may be included/appended by a source machine. In some embodiments, all or some of segment labeling 550 may be included/appended by the DDS (or other device) upon receipt of the backup segment data 540.

Various ones of the present embodiments may ensure data locality by storing (e.g., during the backup process and/or the compaction process) data such that data segments corresponding to common session identifiers are first stored contiguously, and then data segments corresponding to common source identifiers (but differing session identifiers) are next stored contiguously. This relationship is graphically presented in FIG. 3. For example, segments 320a denote the contiguous storage of various backup data segments received from backup source 305a. As depicted, sessions 326a and 326b respectively correspond to backup data from Session 1 and Session 2 of Backup Source A. Data segments corresponding to Session 1 (326a) may be stored contiguously during the compaction process to preserve data locality of the Session 1 data. Similarly, data segments corresponding to Session 2 (326b) may also be stored contiguously to preserve locality of Session 2 data. Next, by virtue of sessions 326a and 326b both corresponding to source 305a, the set of data segments corresponding to 326a may be stored contiguously to the set of data segments corresponding to 326b. In this manner, a much improved level of data locality may be maintained.

In various ones of the present embodiments, data locality may be further ensured via the inclusion of additional constraints during the compaction process. For example, in addition to implementing the above-discussed contiguous storage of segments that share a session identifier and/or source identifier, various embodiments of the present disclosure further impose time-based constraints, such as storage of data segments not only contiguously, but also in a sequence corresponding to an order in which segments are received (e.g., storing segments corresponding to a particular backup contiguously, an in chronological order).

Figure 6:
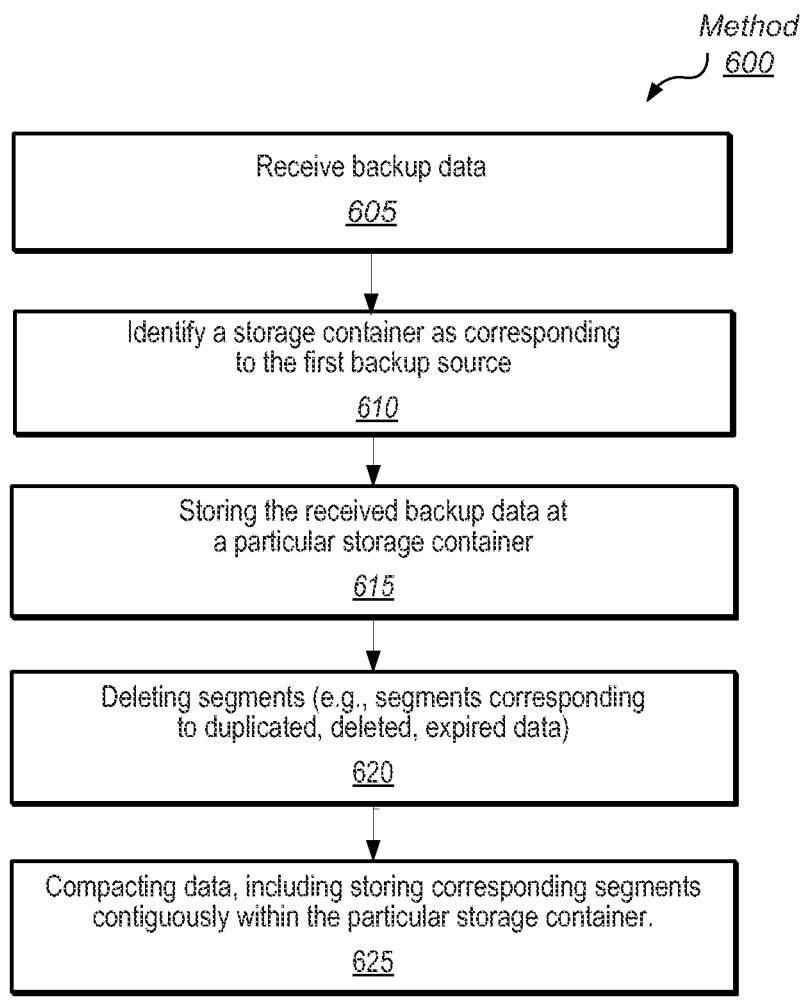
FIG. 6 is a flow diagram illustrating a method for preserving data locality in a deduplication system in accordance with some of the present embodiments.

Turning also to FIG. 6, a flow diagram illustrating one method for using segment data to ensure data locality is shown, according to some embodiments. Method 600 may be executed by a DSS, such as DSS 110 of FIG. 3.

According to the illustrated embodiment, method 600 begins when the DSS receives data corresponding to a particular backup session of a backup source (605). A backup source may correspond to, for example, a particular system or a particular backup configuration. A backup session may correspond to, for example, a particular instance/performance of a backup of a backup source. In accordance with one embodiment, source identification information and/or session identification information may be derived from the received backup data segments. For example, metadata associated with the received backup data segments may contain data that is usable to identify a source and/or session. A storage container (e.g., a file, a set of files) corresponding to the particular backup source may be identified (610), in some cases based on the source identification information associated with the received backup data segments. The backup data may be stored at the identified storage container (615). In some embodiments, the session identification information may be used to determine the storage container for storing the received backup data segments. Subsequently, particular stored segments may be identified for deletion (620). In some embodiments, this identification of deletion may be based on various factors, such as, for example, a deduplication process determining that data corresponding to these segments is stored elsewhere within the storage volume, an expiration of the corresponding data (e.g., expiration of a backup image per a time-based retention policy), or due to user deletion of the corresponding data (e.g., deletion of all references to the corresponding data). This indication of deletion may trigger a compaction process (e.g., performed by the deduplication system). During the compaction process, data segments that correspond to the particular session of the backup source may be stored contiguously within the storage container (625). In this manner, good data locality may be ensured. In some embodiments, the sets of segments corresponding to various backup sessions of the same source may be stored sequentially (e.g., corresponding to the order in which the segments were received by the deduplication system), thereby providing additional data locality.

Optimized Data Retrieval

Figure 7:
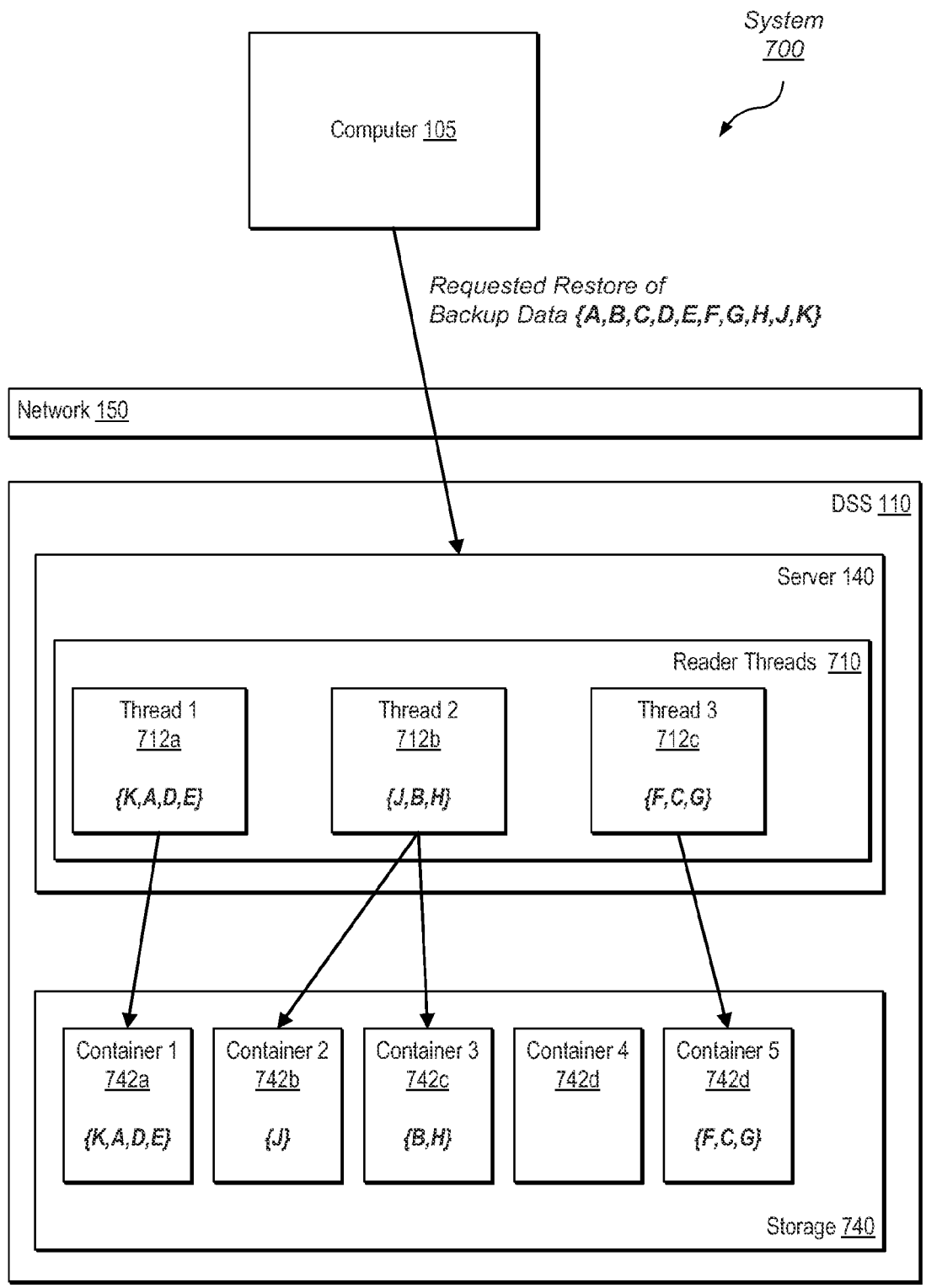
FIG. 7 is a block diagram illustrating various components of a DSS architecture configured to provide optimized retrieval of backup data, according to some embodiments.

FIG. 7 is a block diagram illustrating various aspects of a DSS architecture directed to optimizing data retrieval in a deduplication process in order to improve restoration performance. As noted above, conventional backup operations, which may include deduplication and compaction, may result in scattering of data segments within a backup volume. This scattering may cause segments corresponding to a particular data set to be dispersed among several containers, or sets of containers. Furthermore, this scattering may cause segments to be stored out of sequence. For example, a data set that includes segments A, B, C, D, E may, due to a conventional backup process, be stored across multiple sets of containers in a sequence such as C, x, D, A, E, x, B (with x denoting unrelated data segments). Thus, conventional methods that are well-suited to retrieval of sequentially stored data may provide limited effectiveness when implemented on backup data sets that include scattered data. Accordingly, rehydration performance of conventional techniques may suffer.

In some embodiments, system 700 of FIG. 7 may correspond to network architecture 100 of FIG. 1. For continuity, analogous components are labeled identically. However, in various embodiments, system 700 and network architecture 100 may represent separate systems, such that hardware implementing DSS 110 of FIG. 7 need not always correspond exactly to the analogously named component in FIG. 1.

System 700 includes computer 105, which may be a client computer, sending a request to server 140 of DSS 110 for restoration of backup data. As shown in FIG. 7, the requested data to be restored may be represented by labels A, B, C, D, E, F, G, H, J, K, representing data segments as well as the order of the segments in the original data (e.g., the order of data that was backed up from the source computer). As discussed above, this ordering and contiguity of data segments may, in some cases, not be preserved by conventional backup systems. As illustrated in containers 742 of storage 740 at the lower portion of FIG. 7, the segments may be stored across multiple containers (or sets of containers), in a manner that does not correspond to the original sequence. In the example provided by FIG. 7, the data A, B, C, D, E, F, G, H, J, K is stored across three separate containers (742a, 742b, 742c, and 742d), in the sequence {K, A, D, E}, {J}, {B, H}, {F, C, E}. Thus, conventional methods of data retrieval may require a read operation that traverses the following sequence of containers when attempting to retrieve data segments A, B, C, D, E, F, G, H, J, K:

Container 1→Container 3→Container 5→Container 1→Container 1→Container 5→Container 5→Container 3→Container 2→Container 1.

Thus, the read sequence includes an inefficient traversal of the various containers, thereby leading to inefficient data retrieve performance.

Increasing the speed of data retrieval will generally result in increased data restore performance. The Table below shows user-observed single stream restore performance resulting from various combination of segment read speed and decompression speed.

TABLE

Observed Restore Speed for varying Read and Decompress Speeds

| Read (MB/s) | Decompress (MB/s) | CRC (MB/s) | Restore (MB/s) |
|---|---|---|---|
| 10 | 200 | 1500 | 9.46 |
| 20 | 200 | 1500 | 17.96 |
| 30 | 200 | 1500 | 25.64 |
| 40 | 200 | 1500 | 32.60 |
| 50 | 200 | 1500 | 38.96 |
| 60 | 200 | 1500 | 44.77 |

TABLE-continued

Observed Restore Speed for varying Read and Decompress Speeds

| Read (MB/s) | Decompress (MB/s) | CRC (MB/s) | Restore (MB/s) |
|---|---|---|---|
| 70 | 200 | 1500 | 50.11 |
| 80 | 200 | 1500 | 55.04 |
| 90 | 200 | 1500 | 59.60 |
| 100 | 200 | 1500 | 63.82 |
| 10 | 400 | 1500 | 9.69 |
| 20 | 400 | 1500 | 18.80 |
| 30 | 400 | 1500 | 27.39 |
| 40 | 400 | 1500 | 35.50 |
| 50 | 400 | 1500 | 43.16 |
| 60 | 400 | 1500 | 50.42 |
| 70 | 400 | 1500 | 57.29 |
| 80 | 400 | 1500 | 63.82 |
| 90 | 400 | 1500 | 70.03 |
| 100 | 400 | 1500 | 75.94 |

Figure 8:
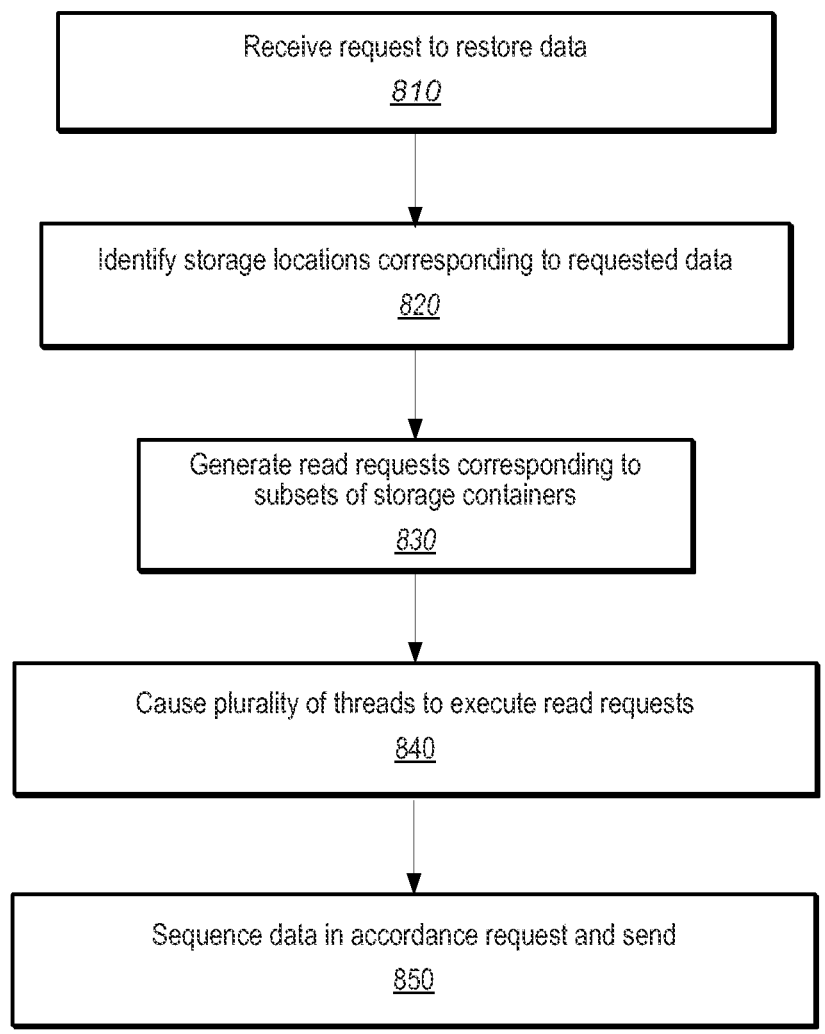
FIG. 8 is a flow diagram illustrating a method for providing optimized retrieval of backup data in accordance with some of the present embodiments.

Continuing with FIG. 7, and also referring to the flow chart presented in FIG. 8, embodiments of the present disclosure may optimize read speeds by use of reader threads 710. As opposed to the inefficient traversal of the various containers 742 that may be performed by conventional methods, as discussed above, individual threads 712 of reader threads 710 may be configured to read data from containers 742 in an optimized manner.

For example, in response to the request to restore data (810) received from computer 105 (which in some cases may include fingerprint information received from an agent running on computer 105), server 140 may identify storage locations corresponding to the requested data (820). In various embodiments, the identified storage locations may be corresponding segment location information that includes, for example, containers and segment byte range within the containers. This data may in some cases be obtained through a fingerprint index maintained by server 140, or elsewhere within DDS 110.

Server 140 may use the identified storage locations to generate various read requests corresponding subsets of the storage containers that correspond to the requested data (830). During this process, the various segments corresponding to requested data may be ordered and divided into groups (e.g., by their Container ID and offset). For example, as depicted in FIG. 7, one read request may correspond to data segments K, A, D, E stored in Container 1, a second read request may correspond to data segments J, B, H stored in Containers 2 and 3, and a third read request may correspond to data segments F, C, G stored in Container 5. These read requests thus correspond to subsets of information stored within a subset of containers that facilitates efficient reading. The request may be further optimized by ordering the data within each request such that segments within a container will be read sequentially, following increasing offsets within the container file (e.g., such that the read may always progress forward within the container).

The read requests may cause a plurality reader threads 712 to execute the read requests (840). In some embodiments, corresponding segments will be read out from containers with asynchronous reader threads. In accordance with the read requests, segments belonging to a container may be read sequentially following increasing offsets within a container file. In some instances, file system page cache may be used instead of maintaining explicit segment cache, and the file system page cached segments may serve the actual restore requests (850) before they are purged out. Thus, explicit user space memory allocation and segment buffering/serving management may be unnecessary.

As noted in 850, some embodiments may also include sequencing of the read data to restore the order of the data in accordance with the request for restore. In the example of FIG. 7, threads 712*a-c* may read and retrieve data segments in an efficient manner that optimizes read performance, but that may result in the read data being in a sequence such as K, A, D, E, J, B, H, F, C, G. Additional processing may be performed to re-sequence the data as A, B, C, D, E, F, G, H, J, K, in accordance with the restore request, prior to sending the data to computer 105.

In some instances, multiple rounds of reads may be performed by threads 712. For example, consider a case in which a requested restore operation includes 1000 segments, and system resources allow for a maximum of ten concurrent reader threads. Furthermore, for purposes of the example, it may be optimal to limit each reader thread to reading ten segments prior to clearing the read data. Thus, an optimal solution for this example may be to perform ten rounds of reads, each performed by ten threads in parallel. Each of these ten rounds would service 100 segments of the requested 1000 segments. As the first 100 requested segments is read by the ten threads, the 100 read segments may be sequenced to correspond to the sequence of the first 100 requested segments and sent to the requesting computer. The next 100 segments may then be processed by server 140 similarly.

Experiments were performed using a test case that included 20 GB data over 40,000 files, with the files averaging 521 KB with random size from 16 KB to 1 MB. The test case involved performance of twenty consecutive backups, with 20% of the files randomly chosen, and each file having a 10% change rate such that the overall data change rate is 2%. Results of the experiments indicated a 5× increase in performance (restore rate increased from 16.5 MB/s to 82.3 MB/s).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method, comprising:
   storing backup data at a computer device, wherein the backup data is from a first of a plurality of backup sessions and from a first of a plurality of backup sources located in separate computer systems, wherein the backup data is stored with a first label identifying the backup data as corresponding to the first backup session and to the first backup source;
   deleting stored data at the computing device, wherein the deleting causes the backup data to be stored non-contiguously;
   rearranging stored data at the computing device, wherein the rearranging includes:
      rearranging, based on the first label, the backup data from the first backup session from being stored non-contiguously to being contiguously stored within a storage container associated with the first backup source; and
      rearranging, based on a second label, backup data from a second backup session from being stored non-contiguously to being contiguously stored within the storage container in response to the second label identifying the backup data from the second backup session as corresponding to the first backup source.

2. The method of claim 1, wherein the deleting causes segments of the backup data from the first backup session to be stored in an order that is different from a sequential order in which the segments were received from the first backup source; and
   wherein the rearranging the stored data includes rearranging the segments in a sequential order corresponding to the order that the segments were received.

3. The method of claim 1, further comprising:
   receiving a request to restore data from the first backup session; and
   in response to the request, executing a plurality of threads in parallel, wherein each thread is executable to read a respective segment from the first backup session.

4. The method of claim 1, further comprising:
   determining that the backup data from the first backup session corresponds to the first backup source based on information received with the backup data from the first backup session.

5. The method of claim 1, wherein the storage container stores backup data from a plurality of backup sessions of the first backup source and backup data from one or more backup sessions of a second backup source that is different from the first backup source; and
   wherein the rearranging the stored data includes:
      storing the backup data from the plurality of backup sessions contiguously within the storage container; and
      storing backup data from the one or more backup sessions contiguously within the storage container.

6. A computing device, comprising:
   a processor;
   memory having stored thereon instructions executable by the processor to cause the computing device to perform operations comprising:
      removing segments of backup data from a storage system, wherein the backup data includes backup data from a first backup session of a first backup source, wherein the backup data includes backup data from a second backup session of a second backup source, wherein the removing causes the backup data to be stored non-contiguously at the storage system; and
      compacting backup data stored at the storage system, wherein the compacting includes:
         rearranging, based on a first label, the backup data from the first backup session such that the backup data from the first backup session is stored contiguously within a first storage container associated with the first backup source, wherein the first label identifies the backup data from the first backup session as being from the first backup source; and
         rearranging, based on a second label, the backup data from the second backup session such that the backup data from the second backup session is stored contiguously within a second storage container associated with the second backup source, wherein the second label identifies the backup data from the second backup session as being from the second backup source.

7. The computing device of claim 6, further comprising:
the storage system that includes the first and second storage containers.

8. The computing device of claim 6, wherein the compacting further includes storing the backup data of the first backup session in a sequential order in which the backup data of the first backup session is received at the storage system.

9. The computing device of claim 6, wherein the removing includes relocating one or more segments of the backup data of the first backup session.

10. The computing device of claim 6,
wherein the backup data from the storage system includes backup data from a third backup session of the first backup source; and
wherein the compacting the data further includes rearranging the backup data from the third backup session such that the backup data from the third backup session is stored contiguously within the first storage container.

11. The computing device of claim 10, wherein the first backup source corresponds to a first remote device included in the storage system, and wherein the second backup source corresponds to a second remote device included in the storage system, wherein the second device is different from the first remote device.

12. The computing device of claim 10,
wherein the first backup source corresponds to a first backup configuration at a first device in the storage system; and
wherein the second backup source corresponds to a second backup configuration at the first device, the second backup configuration being different from the first backup configuration.

13. A non-transitory computer-readable storage medium having stored thereon instructions that responsive to execution by a computing device cause the computing device to perform operations comprising:
storing backup data from a first backup session of a first of a plurality of backup sources associated with different computing systems, wherein the backup data is stored within a first label that identifies the backup data as being from the first backup session and being from the first backup source;
relocating segments of the backup data, wherein the relocating causes the backup data to be stored non-contiguously in a first storage container associated with the first backup source; and
compacting data stored at the first storage container, wherein the compacting includes using the first label to rearrange the data from being stored non-contiguously to being stored as a contiguous group within the first storage container.

14. The non-transitory computer-readable storage medium of claim 13, wherein the compacting further includes storing the backup data in an order that corresponds to an order that segments of the backup data were received at a storage device associated with the computing device.

15. The non-transitory computer-readable storage medium of claim 13, wherein the storing includes removing one or more segments of the backup data to facilitate relocating the segments of the backup data.

16. The non-transitory computer-readable storage medium of claim 13, wherein the compacting further includes rearranging backup data from a second backup session of the first backup source from being stored non-contiguously to being stored as a contiguous group within the first storage container.

17. The non-transitory computer-readable storage medium of claim 16, wherein the first backup source corresponds to a first remote device.

18. The non-transitory computer-readable storage medium of claim 13, wherein the operations further comprise:
receiving a request to restore at least a portion of backup data; and
instantiating a plurality of threads, each executable in parallel to read a respective segment of the portion.

* * * * *